(12) United States Patent
Sobolewski et al.

(10) Patent No.: US 8,481,906 B2
(45) Date of Patent: Jul. 9, 2013

(54) TILTING/TRACKING SYSTEM FOR SOLAR DEVICES (75) Inventors: Arkadiusz Sobolewski, Lawrenceville, NJ (US); Dunbar P. Birnie, III, Princeton, NJ (US); Brian D. Viezbicke, New Brunswick, NJ (US); Brian T. Doyle, Succasunna, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 233 days.

(21) Appl. No.: 12/950,512

(22) Filed: Nov. 19, 2010

(65) Prior Publication Data
US 2011/0120447 A1    May 26, 2011

Related U.S. Application Data (60) Provisional application No. 61/262,671, filed on Nov. 19, 2009.

(51) Int. Cl.
G01C 21/02 (2006.01)
F24J 2/46 (2006.01)
H02N 6/00 (2006.01)

(52) U.S. Cl.
USPC .............. 250/203.4; 126/623; 136/244

(58) Field of Classification Search
USPC .......... 250/203.4; 126/621–623; 136/230, 136/243, 244
See application file for complete search history.

(56) References Cited

U.S. PATENT DOCUMENTS 4,620,771 A * 11/1986 Dominguez .......... 359/591
6,465,725 B1 * 10/2002 Shibata et al. ........ 136/246

* cited by examiner

*Primary Examiner* — Georgia Y Epps
*Assistant Examiner* — Don Williams
(74) *Attorney, Agent, or Firm* — Fox Rothschild LLP (57) ABSTRACT A tracking system is provided for a roof-mounted solar array. The system includes a sensor mechanism for sensing an orientation of the sun relative to the solar array, and a controller connected to the sensor mechanism that generates a signal that represents an optimal tilt angle of the solar array relative to the orientation of the sun. An actuator connected to the controller receives the signal from the controller and adjusts the tilt angle of the solar array in response to the received signal.

17 Claims, 6 Drawing Sheets

TILTING/TRACKING SYSTEM FOR SOLAR DEVICES

CROSS-REFERENCE TO RELATED APPLICATIONS

The present application claims the benefit of U.S. Provisional Patent Application Ser. No. 61/262,671, filed on Nov. 19, 2009, the disclosure of which is incorporated herein by reference in its entirety.

FIELD OF THE INVENTION

The present invention relates to a tilting/tracking system for solar devices, and, more particularly, to a roof-peak mounted tiling/tracking system for a solar array.

BACKGROUND OF THE INVENTION

The economical generation of electricity has long been an important humanitarian objective. More recently the generation of electrical power in an environmentally friendly manner has also become an important objective. Solar electrical generating systems have been provided to meet these objectives. Developments in the movement or tracking of solar electivity generating devices in association with the apparent position of sun over time has produced solar trackers. More particularly, a solar tracker is a device for orienting a daylighting reflector, solar photovoltaic panel or concentrating solar reflector or lens toward the sun. The sun's position in the sky varies both with the seasons and time of day as the sun moves across the sky. Solar electricity-generating devices work most efficiently when the central rays of the sun strike the face of the solar electricity generating elements perpendicularly. Solar generating equipment works best when pointed at or near the sun, so a solar tracker can increase the effectiveness of such equipment (i.e., produce more energy) in comparison to operating such equipment in any fixed position. Solar panel mounting systems are available which include hardware to permanently affix the array to a roof, a pole, or the ground.

Solar trackers may be active or passive and may be single axis or dual axis. Single axis trackers usually use a polar mount (i.e., a mount that has an axis that is oriented in the same direction as the axis of revolution of the earth) for maximum solar efficiency. Single axis trackers can have a manual elevation (axis tilt) adjustment on a second axis which is adjusted at regular intervals throughout the year, which can raise the overall collection efficiency.

Active trackers use motors and gear trains to direct the tracker as commanded by a controller responding to the solar direction. A chronological tracker counteracts the Earth's rotation by turning at an equal rate as the earth, but in the opposite direction. Actually the rates aren't quite equal, because as the earth goes around the sun, the position of the sun changes with respect to the earth by 360° every year or 365.24 days. A chronological tracker is a very simple yet potentially a very accurate solar tracker specifically for use with a polar mount. The drive method may be as simple as a gear motor that rotates at a very slow average rate of one revolution per day (i.e., 15 degrees per hour). In theory the tracker may rotate completely, assuming there is enough clearance for a complete rotation. Alternatively, an electronic controller may be used, with a real time clock that is used to infer the "solar time" (hour angle). Tracking adjustments can be made periodically or continuously.

Residential solar array installations are often solar panels arrays that are fixedly mounted on south-facing roof areas. This arrangement of solar panels arrays is most effective mounted on roofs with essentially east-west oriented roof crests. What is needed, but has yet been provided, is a solar array tracking system that is mountable at the peak of a roof and which has a tracking arrangement that allows a significant amount of east-to-west tilting/tracking during the day.

SUMMARY OF THE INVENTION

Solar array power collection can be improved by having the solar array track the motion of the sun throughout the day, essentially exposing a larger frontal area of the array to the illumination by the sun. The present invention provides a tiltable/tracking system for a solar array that may be mounted on the roof peak of a residential home that has a substantially north-south oriented roof peak. The tilting/tracking of the array produces the maximum power from the array relative to the geometry of the roof that it is mounted on. The solar array tilting/tracking system provides improved solar energy collection for houses and buildings that have long been considered unsuitable for solar installations.

According to one embodiment of the present invention, a method for controlling the tilting and tracking of solar array mounted at the peak of a roof is provided which includes the steps of a) minimizing the angle (the $\Theta_{tilt}$ angle) between a vector that extends normally from the face of the solar array (the N vector) and a vector that extends from the face of the solar array to the apparent position of the sun (the g vector) by parameterizing a full set of N vectors for the array's tilt angle T; b) determining and optimizing the $\Theta_{tilt}$ angle for a given time of day and roof alignment; arid c) adjusting the tilt angle T of solar array to correspond to the calculated optimal $\Theta_{tilt}$ angle.

According to another embodiment of the present invention, a device for controlling the tilting and tracking of solar array mounted at the peak of a roof is provided comprising a microprocessor or computer readable processor to determine an optimal angle for the array tilt for a given day of the year, time of day, and roof alignment; and a drive for tilting and tracking a solar array as the sun's apparent position changes wherein said drive comprises a motor, pulley, gear or lever to push or pull the solar array to the optimal angle for array tilt as determined by the microprocessor.

According to one embodiment of the present invention, a device for controlling the tilting and tracking of solar array mounted at a peak of a roof is provided which comprises a microprocessor or computer readable processor to determine an optimal angle for the array tilt for a given time of day and roof alignment; a drive for tilting and tracking a solar array as the sun's apparent position changes wherein said drive comprises a motor, pulley, gear or lever to push or pull the solar array to the optimal angle for array tilt as determined by the microprocessor; and mounting and fastening means to secure a solar array to a peak of a roof.

An embodiment of the present invention comprises modules having assemblies with at least one degree of freedom to pivot. Systems with one degree of freedom have the advantage of relatively simpler operation and construction. Systems with at least two degrees of freedom have the advantage that they can scan the sky in all X-Y coordinates (North-South, East-West) to perfectly follow the sun as it crosses the sky. That is, with two degrees of freedom, the solar array's optical axis can follow the sun east to west during the day, while also tracking the sun along a north-south axis to follow relative movements of the sun associated with the inclination of the earth's axis throughout the year.

The driving mechanism that can be controlled by a set of solar tracking electronics comprises a computer readable medium and/or microprocessor capable of calculating the "derivation of optimum tilting angle with time", as described below, and which can be installed either inside or outside the sealed module.

In an embodiment of the present invention, the solar array may be tilted or tracked using any known mechanism for rotating a solar array. The solar array may be mounted using any known mechanism for mounting a solar array to a roof peak for tracking longitudinal and/or latitudinal changes in the sun's position. The mount may have a single or double gearing mechanism well known in the art for tracking the sun motion remotely, automatically or manually based on an input set of coordinates. The mechanism may be configured to rotate the panel through a continuous range of angles, or through discrete angular positions, such as 10, 20, 30, or 5, 10, 15, or 1, 2, 3, degrees. To track the sun's position during the day, the mechanism has a gearing or actuator (e.g., hydraulic, magnetic, or manually actuated) for rotating the solar array about the Y axis (longitudinal adjustments). For latitudinal adjustments, the mechanism, gearing or actuator (e.g., hydraulic, magnetic, or manually actuated) can rotate the solar array about the X axis. Any assembly and control system known in the art for single or two-axis rotation of a solar panel or array based may be used to re-position the solar array. In one or more embodiments of the present invention, a tilting/tracking solar array is pivotably mounted to the frame of the module and capable of tracking the sun in at least one dimension across the sky using tracking systems capable of motions through at least one degree of rotational freedom.

An embodiment of the present invention may comprise a solar concentrator, one or more reflectors, a receiver, and a reflector positioning system with an orientation processor for orienting the solar array or concentrator towards the radiation source. The reflector positioning system may include one or more actuators adapted to aim the reflector in accordance with the orientation processor, thereby aiming the reflectors to collect the incident radiation and direct the reflected rays to the receiver as the radiation source moves.

One or more embodiments of the present invention may be implemented with one or more computer readable media, wherein each medium may be configured to include thereon data or computer executable instructions for manipulating data to calculate the "derivation of optimum tilting angle with time" as described below. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include, but are not limited to, random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include, but are not limited to, hard disk drives, magnetic disk drives, tape drives, optical disk drives, and solid state memory chips. The term processor as used herein refers to a number of processing devices including, but not limited to, general purpose computers, special purpose computers, application-specific integrated circuit (ASIC), and digital/analog circuits with discrete components, for example.

In one aspect of the invention, the solar array device includes one or more solar concentrator assemblies having a solar tracking capability. The assemblies can also include an array of photovoltaic receivers and/or thermoelectric receivers, and a tracking mechanism for maintaining alignment of the aperture normals with the sun by at least once daily alignment adjustments to account for seasonal variations in angle of incidence of solar radiation. In a typical embodiment, the solar array assembly possesses at least one degree of freedom of rotation through an arch of at least 15 degrees. Optionally, the tracking adjustments can be made continuously, about every second, about every minute, or about every hour, e.g., during the day.

The solar assembly tracking mechanism can include, e.g., an array of light detectors that provide a first pattern of detector signals. The different patterns can be interpreted according to a defined algorithm to determine the relative angle and direction the module must be turned to provide alignment with the sun. In particular embodiments, power used to drive the tracking mechanism adjustments can be derived from one or more non-concentrated, flat-plate solar cells. In this way, power can be provided to tracking motors even when the solar arrays are not aligned with the sun.

The term "rotational freedom" refers to ability of a component to pivot about an axis. A solar array assembly with one degree of rotational freedom can pivot on one axis (e.g., an X axis). A solar array assembly with two degrees of rotational freedom can pivot on two axes (e.g., X and Y axes).

The solar-electric systems of the invention may comprise devices to efficiently convert solar rays to electrical power. Roof mountable tilting/tracking solar array systems are provided to follow the sun with at least one degree of rotational freedom of movement. One or more embodiments of the present invention may comprise an active or chronological tracker.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Although the present invention can be used in connection with solar energy collecting devices having various payloads (e.g., hot water, steam, electricity, etc.) it is particularly suitable for use in connection with solar panel arrays used for the generation of electricity. Accordingly, the present invention will be described hereinafter in connection with solar arrays. It should be understood, however, that the following description is only meant to be illustrative of the present invention and is not meant to limit the scope of the present invention, which has applicability to other types of solar energy collectors.

Figure 1:
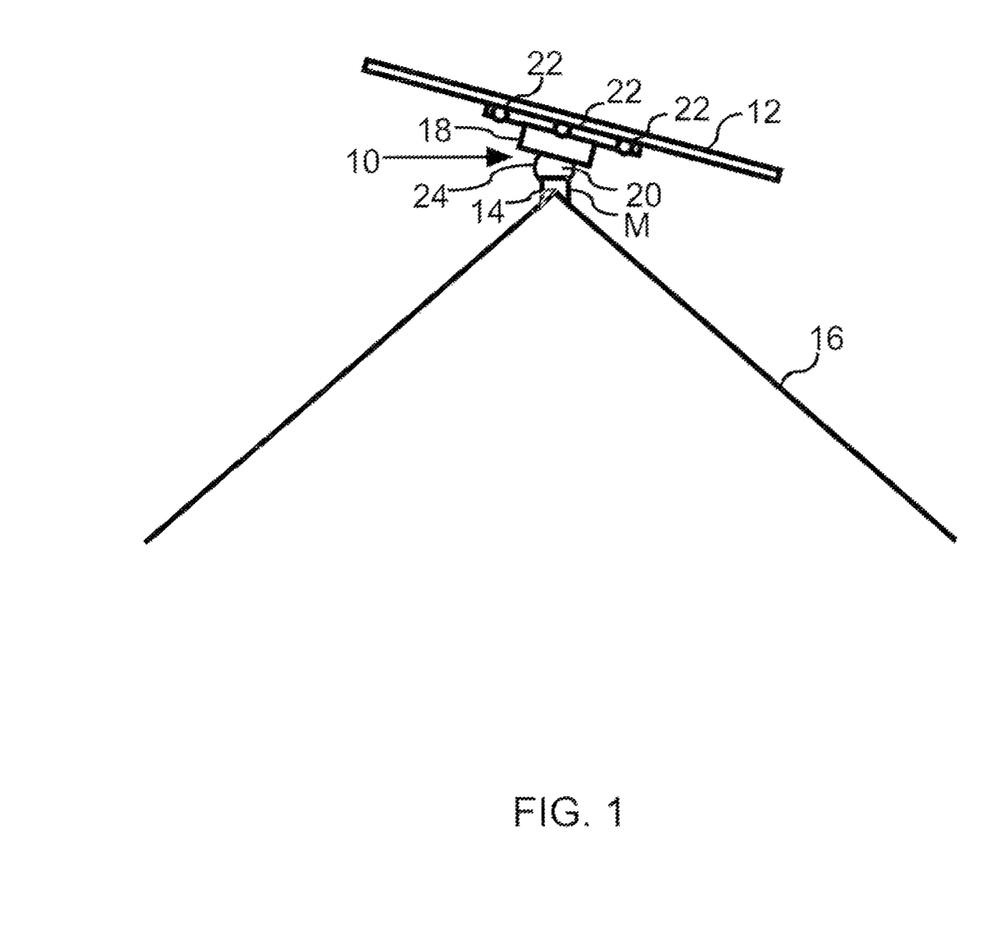
FIG. 1 is a side elevational view of a solar array tilting/tacking system constructed in accordance with an exemplary embodiment of the present invention, the system shown connected to a solar array and mounted on a peak of a roof.

FIG. 1 illustrates a solar array tilting/tacking system 10 constructed in accordance with one embodiment of the present invention. The system 10 is connectable to a solar array 12, and may be mounted on a peak 14 of a roof 16 by means of a conventional mount M. The mount M may be fabricated from material such as wood, fiber, and/or metal. The system has a controller 18 that is connected to an actuator 20. A plurality of photo sensors 22 (e.g., conventional LEDs or photo resistors) are arranged on the system in a pattern for viewing sunlight and provide signals to the controller 18 for purposes that are described hereinbelow.

The actuator 20 has a moveable member 24 that is connectable to the solar array 12 by means of conventional fasteners such as bolts or screws. More particularly the moveable member 24 has an axis of rotation that that may be oriented in the same direction as the peak 14 of the roof 16, thereby permitting the moveable member 24 to rotate the solar array 12 about the peak 14 of the roof 16. A motor (not shown) and conventional mechanical elements such as gears (not shown) are positioned in the actuator 20 and are connected to the moveable member 24. The actuator 20 has an angular positional sensor (not shown) for sensing the tilt angle T of the moveable member 24 (i.e., if the tilt angle T cannot be derived from the motor itself, via a smart motor feature associated with stepper, etc.). The motor may be powered by electricity provided by the solar array 12 for moving the moveable member 24. A battery (not shown) may be included, for storing power supplied by the solar array 12, and connected to the motor for powering the moveable member 24 when sufficient power is not provided by the solar array 12.

The controller 18 includes a computer readable media, a processor with memory and a program. More particularly, as described more fully hereinabove, the controller 18 includes one or more conventional computer readable media configured to include thereon data or computer executable instructions for manipulating data to calculate the "derivation of optimum tilting angle with time" as described below. The computer executable instructions include data structures, objects, programs, routines, or other program modules that are accessed by the processor.

Figure 2:
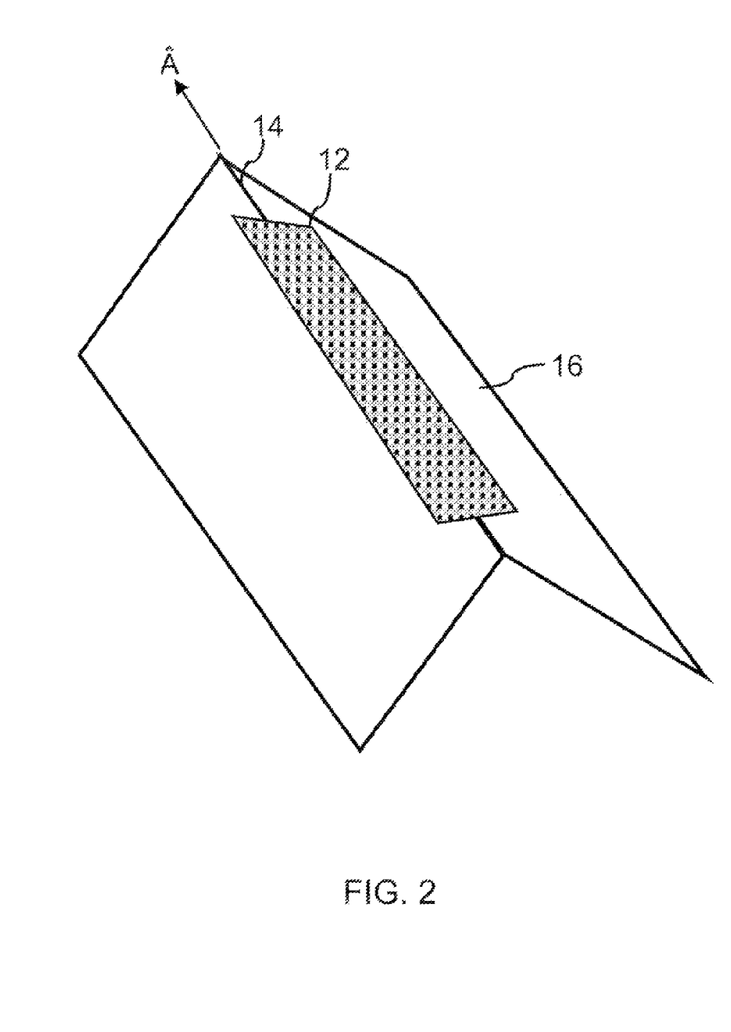
FIG. 2 is a perspective view of the solar array mounted on the peak of the roof shown in FIG. 1.
Figure 3:
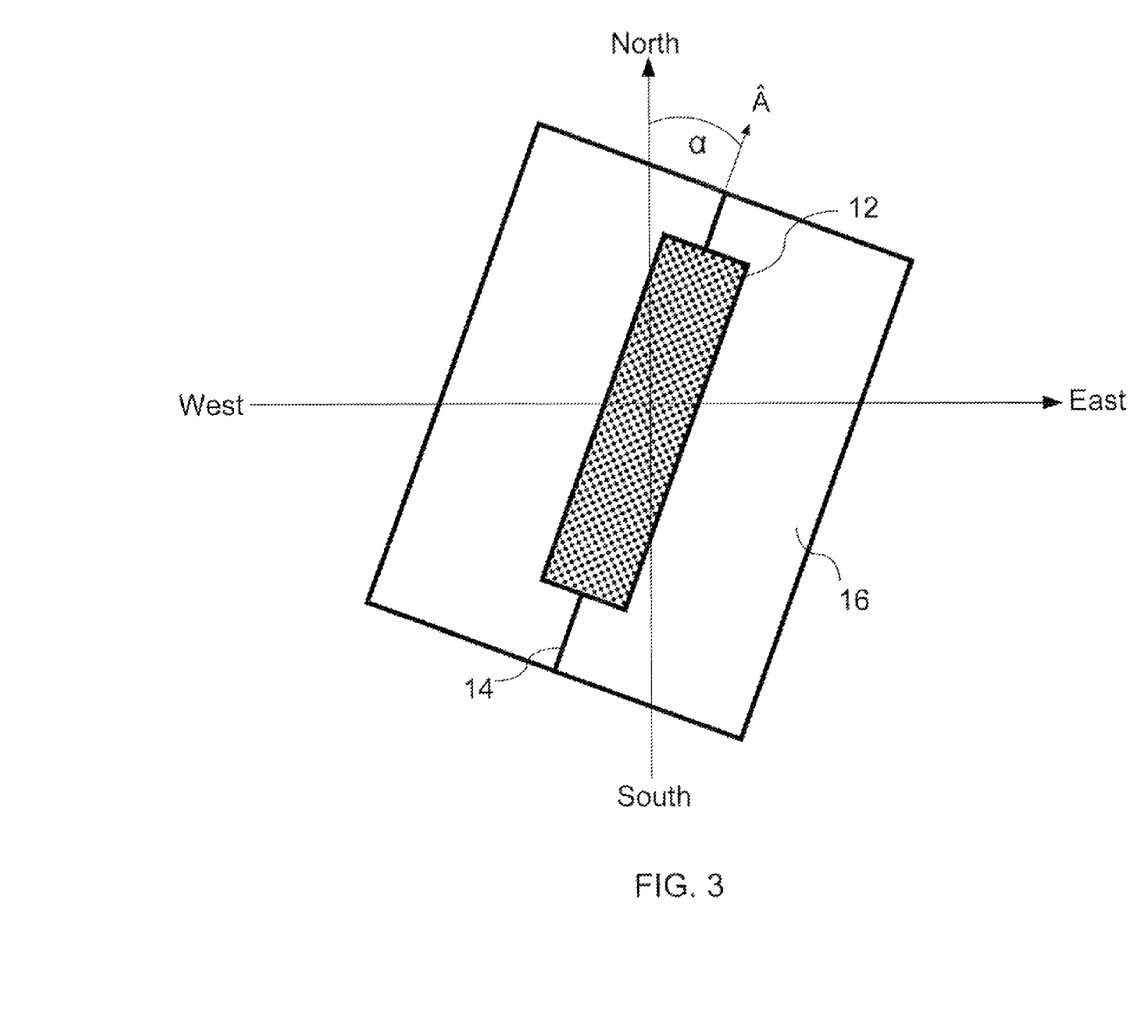
FIG. 3 is a plan view of the solar array mounted on the peak of the roof shown in FIG. 1, the orientation of the longitudinal axis of the solar array being angularly deviated from true North.

FIGS. 2 and 3 illustrate the solar array 12 attached to the system 10 and mounted on the peak 14 of the roof 16. A vector Â points along the axis of rotation of the of the moveable member 24. The angular a deviation of the orientation of the longitudinal axis of the solar array from true north is denoted as deviation angle α, where positive deviation angle α is towards the east, and negative deviation angle α is towards the west.

Figure 4:
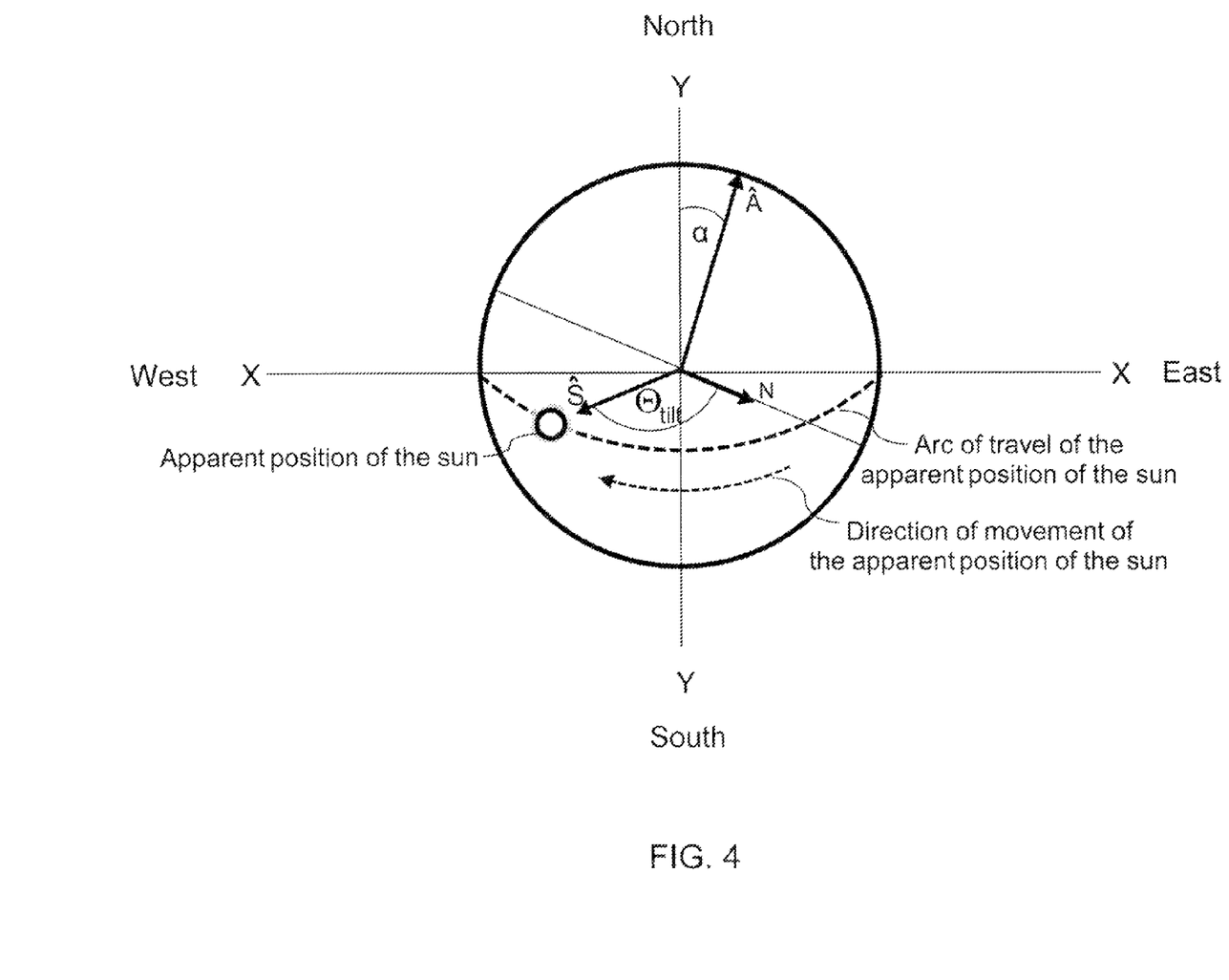
FIG. 4 is a schematic drawing showing the alignment of the peak of the roof with respect to an arc of the sun's apparent position portrayed during the day.

FIG. 4 shows the alignment of the peak 14 of the roof 16 in relation to an arc of travel of the apparent position of the sun. It also depicts a vector N that extends normally from the face of the solar array, a vector Ŝ that extends from the face of the solar array to the apparent position of the sun, and a vector $\Theta_{tilt}$ that extends therebetween. Since a smaller $\Theta_{tilt}$ angle produces a greater solar energy collecting capability, it is desirable to minimize the $\Theta_{tilt}$ angle which is the best alignment of the solar array, subject to the limitations of the roof 16 geometry.

In an embodiment of the present invention, the following method is used to determine the optimal (i.e., minimal) $\Theta_{tilt}$ angle. More particularly, with reference to FIGS. 3 and 4, a local coordinate system is depicted having the X-axis pointing EAST and the Y-axis pointing NORTH (the Z-axis (not shown) points directly vertical (upward) at the location). The sun rises in the east and transits the sky at 15 degrees per hour and the tilt of the arc of travel of the apparent position of the sun changes with the season, being more overhead in the summer and more tilted downward in the winter (for northern hemisphere locations), in a known and predictable manner. The vector Ŝ points to the sun at any given time in this coordinate system. An angle "SunArc" is defined as the angle that defines the arc that the sun travels along in the sky during the day. A "TimeAngle" is defined so as to point at the location along that arc where the sun is at that time-instant. The TimeAngle may be determined by an active or chronological tracker, or calculated for an entire year as it would be observed at the location of the system 10 and loaded onto the computer readable media of the controller 18 at the time of the system 10 installation. The vector Ŝ can then be defined as:

$$\hat{S} = \begin{bmatrix} \cos(TimeAngle) \\ -\sin(TimeAngle) * \sin(SunArc) \\ \sin(TimeAngle) * \cos(SunArc) \end{bmatrix}$$

A more precise vector Ŝ can be defined using latitude, longitude, and day-of-the-year, but in any case the (x,y,z) coordinates of the vector Ŝ are specified. The TimeAngle is defined such that its value is zero at sun up, π/2 at noon, and π at sundown.

Since the solar array 12 is a planar object and it rotates around the axis Â, to specify the orientation of the solar array 12 in three dimensions it is sufficient to define the solar array's surface normal vector, N, in space. By definition N is perpendicular to Â.

A mapping of the full set of N vectors that represent all possible tilt values for the solar array 12 would sweep out a great circle aligned wherein the normal to the great circle is the vector again. One such N vector is shown in FIG. 4, but the diagonal line upon which it is drawn is the locus of all possible N vectors.

In this manner, the system 10 determines the unique N vector that will hold the solar array 12, for that instant in time, most closely to the position of the sun, subject to the limit that it can only rotate around its fixed single axis.

The system minimizes the angle between N and Ŝ by parameterizing the full set of N vectors with a single variable, the tilt angle T of solar array 12. The angle between N and Ŝ is defined as $\Theta_{tilt}$ wherein zero corresponds to an alignment of the face of the solar array 12 which is flat or horizontal, with N pointing straight up. Positive angles indicate tilts toward the EAST and negative angles indicate tilts toward the WEST. N can be defined as:

$$N = \begin{bmatrix} \sin(\Theta_{tilt}) * \cos(\alpha) \\ -\sin(\Theta_{tilt}) * \sin(\alpha) \\ \cos(\Theta_{tilt}) \end{bmatrix}$$

N and $\hat{S}$ are both defined as unit vectors. Thus the cosine of the angle between N and $\hat{S}$ is found by taking the dot-product of N and $\hat{S}$. The $\Theta_{tilt}$ value that minimizes the angle between the N and $\hat{S}$ is calculated, which is equivalent to maximizing the cosine of the angle between them.

F is defined as the dot product of N and $\hat{S}$ and to find the maximum, the derivative of F with respect to $\Theta_{tilt}$ is calculated. The derivative of F is solved for the value of $\Theta_{tilt}$ where the derivative is zero to determine the extremum of F, which is the best tilt angle for the array at that time.

$$F = \hat{S} \cdot N$$
$$\frac{\partial F}{\partial \Theta_{tilt}} = 0$$
$$\tan(\Theta_{tilt}) = \frac{\cos(\alpha) * \cos(TimeAngle) + \sin(\alpha) * \sin(TimeAngle) * \sin(SunArc)}{\sin(TimeAngle) * \cos(SunArc)}$$

This closed form solution gives the optimum angle for the array tilt for a given time of day and roof alignment. However, when considering real roof installations, it is clear that the tilting is not free to move through all angle values. In the very early morning (AM) or late afternoon, the sun will be very low down and the "best" tilt angle will be directed much lower toward the horizon than physically allowed by the roof 16 itself.

Figure 5:
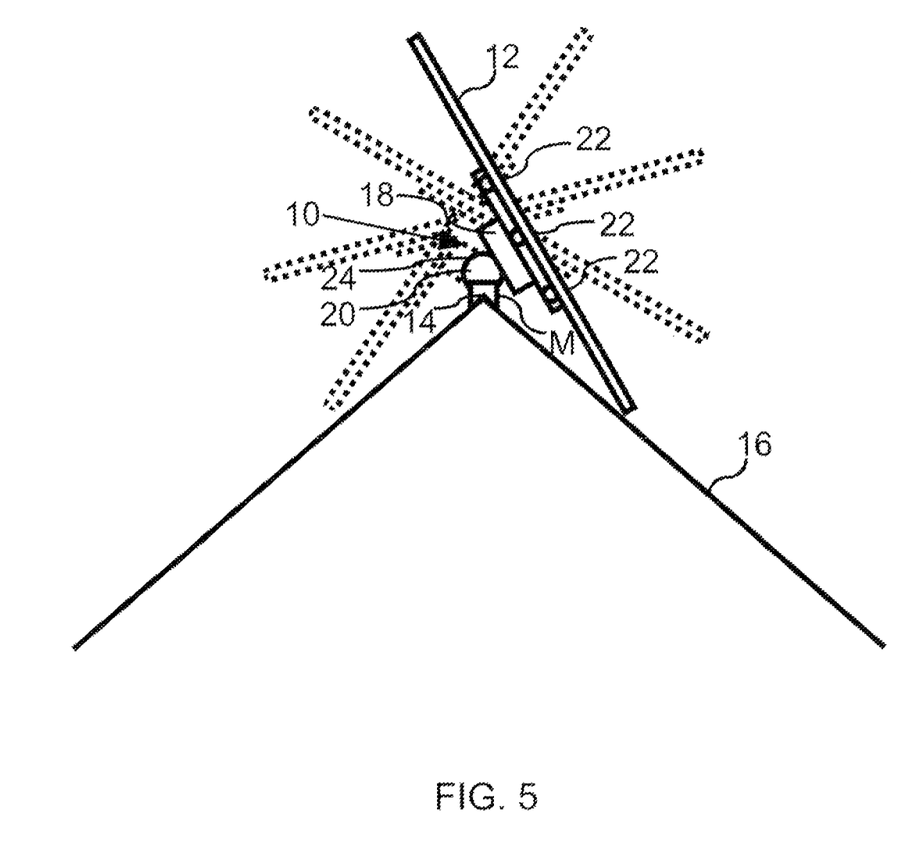
FIG. 5 is a side elevational view of the system which depicts the limits in the range of motion of the solar array imposed by the roof structure.

FIG. 5 illustrates several tilt angles T and the range of motion of the solar array 12 around an axis of rotation of the actuator 20 of the system 10. Because of the physical limits of the installation, and in order to avoid tilt angles a that rotate the solar array 12 further than can be tolerated, the system 10 may be provided with minimum and maximum tilt angle T sensors.

Figure 6:
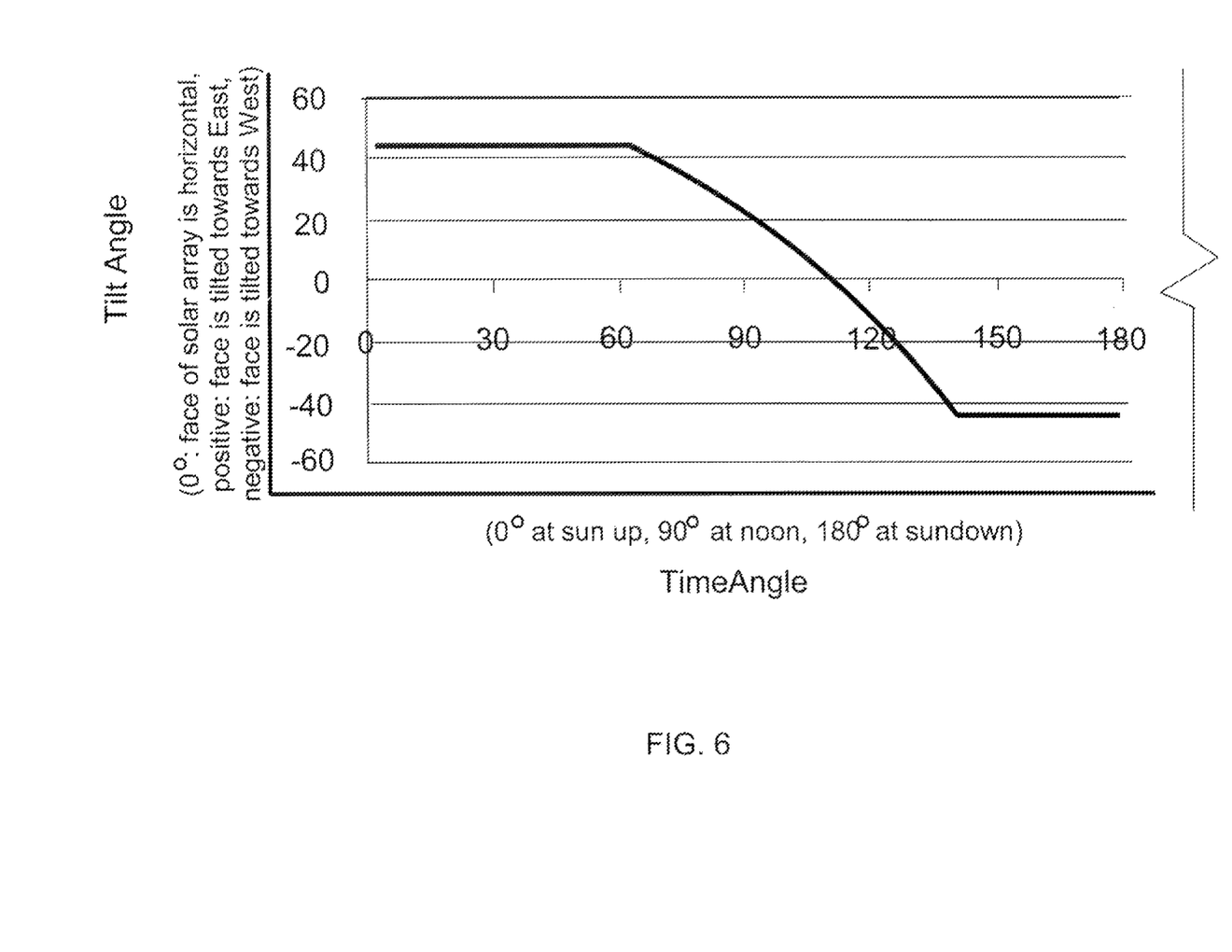
FIG. 6 is a graph showing the relationship between an angle of tilt of the face of the solar array versus an angle of the apparent position of the sun during the day for the following conditions: a) the solar array is mounted on a roof with a 45° pitch, b) the longitudinal axis of the roof peak has an angle of deviation from true north of 30°, and the sun is transiting the sky on an arc that is tilted 40° down from overhead.

FIG. 6 illustrates the tilt angle T of the solar array 12 (depicted on the y-axis) versus the TimeAngle (depicted on the x-axis), as it progresses during the day. In this example, the tilt angle T is derived for the following conditions: a solar array 12 mounted on a roof with a pitch of 45° and a deviation angle α of 30° and the sun transiting the sky on an arc that is tilted 40° down from overhead.

Installation and Operation of the System 10

Prior to the installation of the system 10 on the peak 14 of the roof 16, the deviation angle α is measured and pre-loaded into the controller 18. The system 10 is connected to the solar array 12. More particularly, the moveable member 24 of the actuator 20 is attached to the bottom of the solar array 12, and the face of photo sensors 22 are oriented in a plane that is parallel with the face of the solar array 12, and are positioned to view the sun without obstruction. The controller 18 of the system 10 is electrically connected to a power outlet of the solar array 12. The actuator 20 of the system 10 is then fixedly attached to the mount M which is installed at the peak 14 of the roof 16.

In operation, the controller 18 receives signals from the photo sensors 22 (e.g., periodically sampled relative voltages) that allow the program of the controller 18 to evaluate and periodically output the vector $\hat{S}$. Periodically, such as every three minutes, the controller 18 determines the optimal $\Theta_{tilt}$ vector and the associated optimal tilt angle T. The controller 18 then transmits the optimal tilt angle T to the actuator 20, wherein the actuator 20 rotates the moveable member 24, and the solar array 12 attached to it, to the optimal tilt angle T.

It should be noted that the present invention can have numerous advantages and benefits. The value of the extra energy collected by the solar array 12, that is tilted/tracked by the system 10, over time more than offsets the cost of the system 10. For example, throughout the day, and integrating through the full seasonal variation, it is possible to calculate the amount of energy collected during a typical year. These numbers can be compared with values that would be achieved for fixed arrays of various orientations. Referring to FIG. 6, for example, it is noted that early in the day (TimeAngle<−62°), the solar array 12 cannot tilt down as far as the ideal would suggest; it maxes out at the roof-pitch value. As the TimeAngle progresses through the day, the system 10 will track the sun, but since the sun is significantly southward, the system 10 delays its tracking (because of deviation angle a being slightly east-ward). In the afternoons (with TimeAngle>−142°) the solar array 12 reaches a maxed out situation again. As a basic comparison with fixed array installations, it has been determined that fixed arrays in New Jersey, for example, with south facing orientation on 45°-pitch roofs would capture on the order of 300 kWhr/m2/yr. It has been calculated that a roof with the same pitch, but with the peak 14 of the roof 16 oriented north-south and having a solar array 12 controlled by the system 10 mounted on the peak 14 of the roof 16 would capture about 360 kWhr/m2/yr. This is an increase of about 20% in the energy captured. As a comparison, an east facing roof at 45°-pitch would only gather 200 kWhr/m2/yr in a fixed roof installation, which explains why relatively few people have east-facing (or west-facing) arrays of this nature.

It will be understood that the embodiment described herein is merely exemplary and that a person skilled in the art may make many variations and modifications without departing from the spirit and scope of the invention. All such variations and modifications, including those described above, are intended to be included within the scope of the invention.

What is claimed is:

1. A tracking system for a solar array, comprising:
    a controller having a program for generating a signal that represents an optimal tilt angle of the solar array; and
    an actuator connected to said controller, said actuator receiving said signal from said controller and adjusting a tilt angle of the solar array to equal the optimal tilt angle in response to said received signal,
    wherein the optimal tilt angle is the tilt angle of the solar array about an axis of rotation of the actuator that provides a minimum angle between a vector normal to the face of the array and a vector extending from the face of the array toward an apparent position of the sun.

2. The tracking system of claim 1, wherein said controller includes a sensor mechanism for sensing the orientation of the sun relative to the solar array, said sensor mechanism generating said signal in response to said orientation of the sun.

3. The tracking system of claim 2, wherein said sensor mechanism includes a light emitting diode.

4. The tracking system of claim 2, wherein said sensor mechanism includes a photo resistor.

5. The tracking system of claim 1, wherein said program is programmed with an orientation of said actuator relative to north.

6. The tracking system of claim 1, wherein said actuator includes a moveable member.

7. The tracking system of claim 6, wherein said actuator includes a motor connected to said moveable member for adjusting said moveable member in response to said signal.

8. The tracking system of claim 6, wherein said actuator includes a limit switch for limiting the movement of said moveable member to thereby limit the movement of the solar array.

9. The tracking system of claim 1, wherein said actuator is connected to the solar array for receiving power from the solar array.

10. The tracking system of claim 9, further including a battery connected to said actuator or storing power received from the solar array.

11. The tracking system of claim 1, wherein said signal is dependent upon orientation of the sun for a given day of the year, time of day, and roof alignment.

12. The tracking system of claim 1, wherein the solar array is installed at a peak of a pitched roof with a pitch angle that limits the tilt angle of the solar array, and wherein the axis of rotation of the actuator is parallel to the peak of the pitched roof.

13. A method for tracking a solar array, comprising:
generating, by a controller, a signal that represents an optimal tilt angle of the solar array; and
adjusting, by an actuator, a tilt angle of the solar array to equal the optimal tilt angle in response to said signal,
wherein the optimal tilt angle is the tilt angle of the solar array about an axis of rotation of the actuator that provides a minimum angle between a vector normal to the face of the array and a vector extending from the face of the array toward an apparent position of the sun.

14. The method of claim 13, wherein said signal is generated dependent upon orientation the solar array relative to north.

15. The method of claim 13, wherein said signal is generated by a sensor mounted to the solar array.

16. The method of claim 13, wherein said signal is generated dependent upon orientation of the sun for a given day of the year, time of day, and roof alignment.

17. The method of claim 13, wherein the solar array is installed at a peak of a pitched roof with a pitch angle that limits the tilt angle of the solar array, and wherein the axis of rotation of the actuator is parallel to the peak of the pitched roof.

* * * * *